United States Patent [19]

Platte et al.

[11] 4,083,912

[45] Apr. 11, 1978

[54] PROCESS FOR THE COMPRESSION OF BLACK POWDER

[75] Inventors: Friedrich Platte, Essen; Wolfgang Wiedemann, Dulmen, both of Germany

[73] Assignee: Wasagchemie GmbH, Munich, Germany

[21] Appl. No.: 547,987

[22] Filed: Feb. 7, 1975

Related U.S. Application Data

[63] Continuation-in-part of Ser. No. 274,493, Jul. 24, 1972, abandoned.

[30] Foreign Application Priority Data

Aug. 3, 1971 Germany .............................. 2138724

[51] Int. Cl.[2] ................................................ B29J 5/10

[52] U.S. Cl. .................................. 264/120; 264/3 R; 425/335; 425/364 R; 425/371; 425/373

[58] Field of Search ............... 264/109, 120, 3 A, 3 B, 264/3 R; 425/364, 335, 373, 371, 79

[56] References Cited

U.S. PATENT DOCUMENTS

| | | | |
|---|---|---|---|
| 2,356,826 | 8/1944 | Coss | 264/120 |
| 2,677,334 | 5/1954 | Hansen | 425/335 |
| 3,071,805 | 1/1963 | Merkle | 264/120 |

*Primary Examiner*—Robert F. White
*Assistant Examiner*—James R. Hall
*Attorney, Agent, or Firm*—Hammond & Littell

[57] ABSTRACT

A novel method for the continuous production of compressed higher density black powder comprising feeding from a feed container means mealy black powder of low density enclosed between upper and lower endless belts into a precompression zone, to produce precompressed black powder, and to expell air contained in said black powder, passing the precompressed black powder through a primary compressing zone containing a primary compression means to achieve a new orientation and displacement of the said black powder, then passing the black powder through a final compressing zone containing a final compression means, while supplying the final pressure to obtain breaking or flow of the crystals as well as crystal lattice displacements of said black powder, and recovering the compressed higher density black powder, each of said primary compression means and said final compression means being capable of building-up compaction pressure as well as being capable of idling, the black powder being moved through said precompression zone, said primary compressing zone and said final compressing zone by synchronized lateral movement of said primary and final compression means towards and away from each other and said black powder being withdrawn from said feed container means onto said lower belt by said movement of said primary and final compression means, whereby the build-up of compaction pressure and the idling time of each of said primary and final compression means is synchronized with the forward movement of said black powder caused by the advancing movement of said primary and final compression means.

2 Claims, 5 Drawing Figures

PROCESS FOR THE COMPRESSION OF BLACK POWDER

PRIOR APPLICATION

This application is a continuation-in-part of our copending, commonly assigned U.S. patent application Ser. No. 274,493 filed July 24, 1972 now abandoned.

PRIOR ART

According to a conventional process, black powder as a granular material is first compacted, subsequently broken, granulated and screened. This results in a black powder having a higher density than that of the starting material. Another process is known wherein the compacting is carried out between one or several pairs of rollers but this process, however, can only be applied to finished black powder of lower density.

In one known process, hydraulic presses are used to compact black powder by manually building a pile of plates wherein first a metal plate is covered with canvas, then a flexible frame is placed thereon and filled with black powder in grain form, the frame is covered with another canvas and then a second metal plate is placed thereon which will act as the base for the next unit. After a pile of these units is formed, they are subjected to a single hydraulic pressing step to process a plurality of units at once to increase production. It is necessary to use these individual units to reduce the area of lower compression caused by the known sliding cone occurring at higher pressures. The intermediate canvas layers prevent the black powder from sticking onto the intermediate plates. The disadvantages of this process are that it is expensive due to the labor and time needed to construct the units and it is not suitable for automatic or semi-automatic production of black powder of higher density.

OBJECTS OF THE INVENTION

It is an object of the invention to provide a process for the economical compacting of black powder, which is suitable for a fully or partially automated manufacturing plant.

It is another object of the invention to provide a method for the continuous production of compressed black powder comprising feeding black powder enclosed between two endless belts into a precompression zone, passing the precompressed black powder through a primary compressing zone, then passing the black powder through a final compressing zone while applying the final pressure and recovering the compressed black powder, the black powder being moved through compressing zones by movement of the compressing means.

It is a further object of the invention to provide a method for continuous production of compressed black powder comprising means for feeding black powder onto a lower endless belt and in between said lower belt and an upper endless belt provided with compressible sealing means on the outer edges thereof, a means for precompressing the black powder between the two endless belts, a longitudinally moveable, primary compression means for initially compressing the black powder while longitudinally moving the same, a longitudinally moveable, final compression means for compressing the black powder while moving the same, and discharge means for recovering the compressed black powder.

These and other objects of the present invention will become apparent as the description thereof proceeds.

DESCRIPTION OF THE INVENTION

The present invention is directed to a method for the continuous production of compressed black powder comprising feeding black powder enclosed between two endless belts into a precompression zone, passing the precompressed black powder through a primary compressing zone, then passing the black powder through a final compressing zone while applying the final pressure and recovering the compressed black powder, the black powder being moved through compressing zones by movement of the compressing means.

The present invention is further directed to a method for continuous production of compressed black powder comprising means for feeding black powder onto a lower endless belt and in between said lower belt and an upper endless belt provided with compressible sealing means on the outer edges thereof, a means for precompressing the black powder between the two endless belts, a longitudinally moveable, primary compression means for initially compressing the black powder while longitudinally moving the same, a longitudinally moveable, final compression means for compressing the black powder while moving the same, and discharge means for recovering the compressed black powder.

According to the invention, the compacting of the mealy black powder of low density takes place rhythmically and continuously in the precompacting, primary compressing, and final compressing zones between continuously moving belts by means of longitudinally moveable presses. The charge material is removed from the feed container by means of a lower belt and while enclosed between an upper belt and the lower belt, it is precompacted and the air contained in the loose black powder is expelled by a pair of rollers for example and is then transported to the primary pressing zone in which a new orientation and displacement of the black powder occurs and subsequently to the final pressing zone wherein a breaking or flow of the crystals as well as crystal lattice displacement of the black powder occurs.

The primary press and the final press advance the upper and lower belts in the forward direction. Preferably, while one press is moving in one direction during its working cycle, the other press is synchronized to move in the opposite direction during its idling cycle. The compacted material is easily discharged by the simultaneous returning of the upper and lower endless belts in opposite directions around a pair of end rollers. The apparatus may be provided with compressible sealing means which is carried along at the outer perimeter of the belts, and this compressible sealing means serves as the bilateral limit during the compaction.

An advantage of the present process over the conventional processes is a savings in terms of labor and time, as well as an improved economy of operation. In the known process involving compaction by a single plate or compaction by a series of vertically stacked plates, the compaction is less at the outer perimeter of the plate. This results in four outer zones of lesser compression which adversely influences both the quality and the quantity of the finished product. However, in the process of the invention, the single particles support each other in the longitudinal direction so that only two outer zones with a lesser degree of compression are formed. This reduces the amount of material from the presses which must be recycled.

The process of the invention makes it possible to automate the compaction and to divide the operation into three stages: pre-compression, primary pressing and final pressing with a short stroke of the press. The present process achieves a substantially higher efficiency by synchronizing the build-up of compaction pressure and the idling time of a press with the forward movement of the belts caused by the advancing movement of the presses.

The invention will be illustrated by reference to the following drawings which are not to be deemed limitative of the present invention in any manner thereof:

Figure 2:
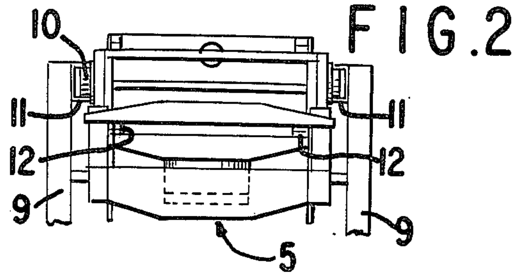
FIG. 2 is a sectional view along line A—A' through the device of FIG. 1.

The apparatus used for the invention consists of feed container 1 provided with means 2 for adjusting the thickness of the layer of black powder on lower endless belt 3. Lower belt 3 and upper belt 4 with elastic sealing means 12 on the outer edges thereof confine the black powder during the compression process. The black powder in between the endless belts is passed between a pair of rollers 13 and 13*a* which act as a precompression means and then is passed to the compressing zone. Hydraulic presses 5 and 7 are suspended on rollers 10 which ride on rails 11. The presses 5 and 7 are moved longitudinally by action of cylinders 6 and 8, respectively. The entire device is supported by supports 9. The lower endless belt 3 rotates about rollers 14 and 14*a* and upper endless belt 4 rotates about roller 14 and the uppermost roller 13*a* of rollers 13 and 13*a*.

Figure 1:
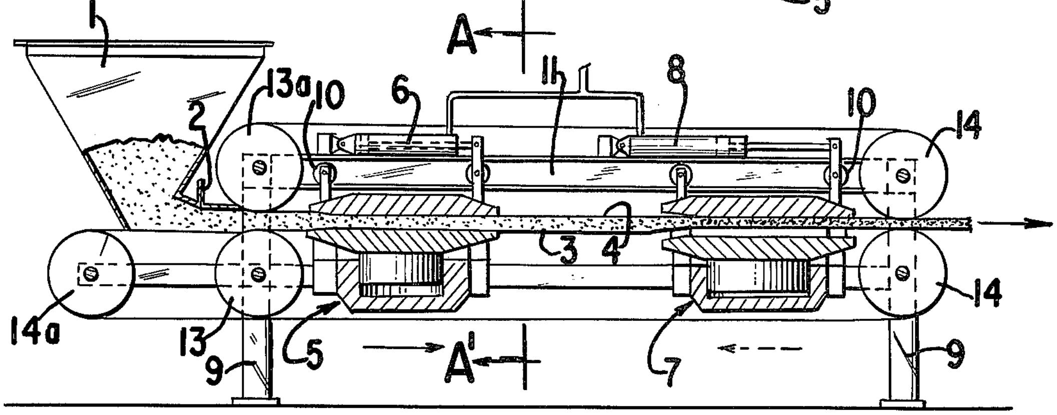
FIG. 1 is a side view of the compression device of the invention.
Figure 3:
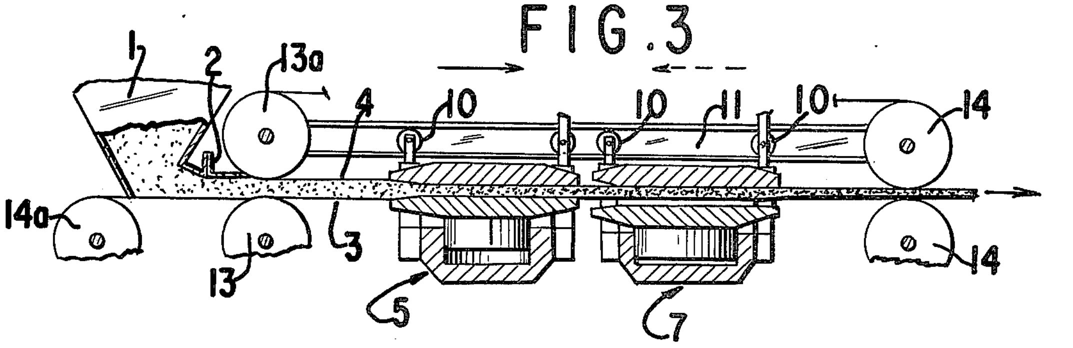
FIG. 3 is a side view of the compression device showing compression by the primary press and movement of the presses to the center.
Figure 4:
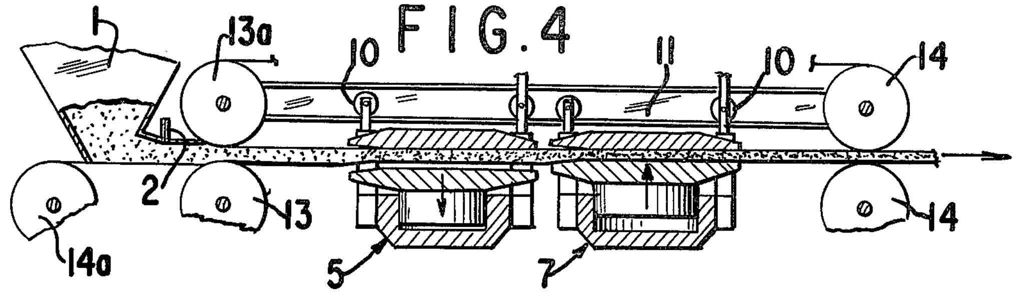
FIG. 4 is a side view of the compression device showing compression by the final press and release by the primary press.
Figure 5:
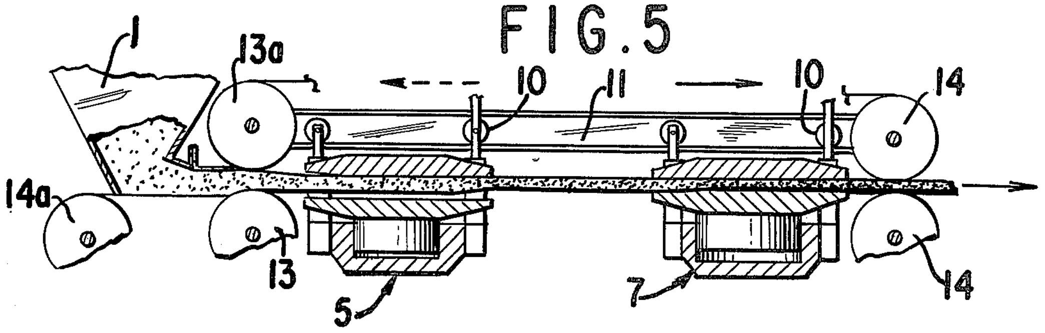
FIG. 5 is a side view of the compression device showing movement by the presses away from the center, with pressing by the final press.

The process is illustrated in the sequence of FIGS. 1,3,4 and 5. FIG. 1 shows the apparatus in the starting position. The arrows indicate the direction of the movement of the hydraulic presses. As shown by FIG. 3, the primary press 5 which is hydraulically operated exerts an initial compression force on the upper and lower belts 4 and 3 and on the black powder therebetween; and is longitudinally moved to the center by hydraulically operated cylinder 6, thereby advancing the upper and lower belt with the pre-compressed black powder held therebetween. This movement of the belts simultaneously removes a layer of loose material from the feed container 1, and the thickness of the layer is adjusted by the regulating device 2. The loose material is contained between these upper and lower belts and is given a pre-compression between the pair of precompressing rolls 13 and 13*a*. Simultaneously, the final press 7 which is opened in FIG. 1 is in a non-compressed state and in FIG. 5 is moved by cylinder 8 to the center, so that the primary compressed section moves a distance equal to twice the length of the way the press travels and arrives into the final compression zone. This synchronized operation of the two presses is, according to the present invention, achieved by a fluid control system including an hydraulic connection between the inlet and outlet sides of the hydraulically operated pistons of the two cylinders 6 and 8 that longitudinally move the presses 5 and 7, respectively. The presses are reposed on rolls 10 guided on rails 11. However, the synchronized operation can be achieved by means of any other suitable system of mechanical elements. The different compression pressures of the two presses are achieved by different ram diameter of their cylinders. It is also possible to produce the different compression pressures in another manner, such as by applying different hydraulic pressures to pistons of equal diameters or by using different numbers of smaller cylinders of the same diameter.

As shown in FIG. 4, the primary press 5 and the final press 7 have moved to the center of the compression zone of the apparatus. The primary press 5 is then opened (as indicated by the arrow) and simultaneously the final press 7 is hydraulically closed (as indicated by the arrow) so that the final compression of the primarily compressed section can be carried out. FIG. 5 shows the final press being closed around the upper and lower belts and the final press moving to the right thereby taking along the upper and lower belts. The pre-compressed section is moved a distance equal to twice the press-travel length into the opened primary press which has been moved to the left. More loose feed material is precompressed by rollers 13 and 13*a* while more loose material continues to flow onto the lower belt from the feed container. After the primary press and the final press have been separated by the maximum distance as shown by FIG. 5 the cycle is repeated. At the exit end of the compactor, sections of the continuously formed sheet of compressed black powder are pulled out of the compactor between guide rollers 14. The simultaneous returning of the belts over the guide rollers 14 produces an even removal of the compressed black powder from the belts. The resulting compacted material can then be transported to further processing equipment.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A method for producing a continuous sheet formed from compressed black powder, comprising:

(a) feeding from a feed container low density, mealy, black powder crystals enclosed between upper and lower endless belts, and moving said powder into a precompression zone to expel air in said powder and produce precompressed black powder, (b) moving said precompressed powder through a primary compression means capable of idling and for building up compaction pressure on said precompressed powder to further compress said precompressed powder into a continuous sheet and to achieve a new orientation and displacement of said black powder, (c) moving said continuous sheet through a final compression means capable of idling and for building up a final compaction pressure to break said crystals within said sheet, and to obtain crystal lattice displacements therein, (d) moving said continuous sheet by a synchronized longitudinal movement of said primary and said final compression means towards and away from each other, (e) synchronizing the buildup of the compaction pressure on said precompressed powder and the idling time of each of said primary and said final compression means to move said continuous sheet longitudinally by the advancing movement of said primary and said final compression means, and (f) recovering the continuous sheet formed from compressed black powder.

2. The method of claim 1 wherein said upper and lower endless belts are advanced by the movement of said primary and final compression means.

* * * * *